UNITED STATES PATENT OFFICE.

MORITZ ULRICH AND JOHANN BAMMANN, OF ELBERFELD, GERMANY, ASSIGNORS TO THE FARBENFABRIKEN, VORMALS FR. BAYER & CO., OF SAME PLACE.

DARK-BLUE AZO DYE.

SPECIFICATION forming part of Letters Patent No. 578,432, dated March 9, 1897.

Application filed April 16, 1895. Serial No. 545,945. (Specimens.)

*To all whom it may concern:*

Be it known that we, MORITZ ULRICH and JOHANN BAMMANN, chemists, doctors of philosophy, residing at Elberfeld, Prussia, Germany, (assignors to the FARBENFABRIKEN, VORMALS FR. BAYER & CO., of Elberfeld, Germany,) have invented a new and useful Improvement in the Manufacture of Dark-Blue Dyes; and we do hereby declare the following to be an exact and clear description of our invention.

Our invention relates to the production of dark-blue substantive dyestuffs resulting from the combination of one molecular proportion of tetrazotized paradiamin—as, for example, benzidin, tolidin, dianisidin—one molecular proportion of amidonaphtholdisulfo-acid, ($NH_2 : SO_3H : SO_3H : OH = 2:3:6:8$,) and one molecular proportion of amidonaphthol-monosulfo-acid, ($NH_2 : SO_3H : OH = 1:4:8$,) which dyestuffs, when fixed on unmordanted cotton fiber, can be diazotized and coupled with so-called "developers,"—as, for example, beta-naphthol, metatoluylenediamin, and so on—darker and faster shades being thus obtained.

In carrying out our invention practically we can proceed as follows: 1.84 kilos, by weight, of benzidin are converted in the well-known manner into the tetrazo compound by means of 1.4 kilos, by weight, of sodium nitrite and four liters of hydrochloric acid, (21° Baumé,) adding one hundred and forty liters of water. This tetrazo solution is neutralized with sodium-carbonate solution until the liquid gives neither an acid nor alkaline reaction. Into the thus-obtained neutral tetrazo solution such a quantity of the sodium salt of amidonaphtholdisulfo-acid ($NH_2 : SO_3H : SO_3H : OH = 2:3:6:8$) is allowed to run as corresponds to 0.7 kilos, by weight, of sodium nitrite, with the addition of 2.5 kilos, by weight, of sodium carbonate, ($Na_2CO_3$.) The formation of the so-called "intermediate product" is complete in a few minutes. It separates in form of a dark precipitate. A solution prepared by dissolving such a quantity of the sodium salt of amidonaphtholmonosulfo-acid ($NH_2 : SO_3H : OH = 1:4:8$) as likewise corresponds to 0.7 kilos, by weight, of sodium nitrite is then stirred into the above mixture containing the intermediate product. The resulting reaction mixture is allowed to stand during about twenty-four to thirty hours at ordinary temperature. After this time the combination is complete and the mixture is advantageously heated at about 60° centigrade. The dyestuff thus formed is salted out, filtered off, pressed, and dried. The dyestuff, which has the following constitution:

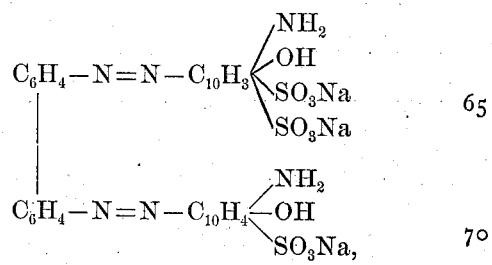

forms, when pulverized, a dark powder easily soluble in water with a bluish-black color, almost insoluble in cold and hot alcohol, soluble in ammonia liquor with a bluish-violet color. By concentrated soda-lye (35° Baumé) it is slightly dissolved with a violet color. By concentrated sulfuric acid (66° Baumé) it is dissolved with a greenish-blue color, which turns, on the addition of ice-water to this sulfuric-acid solution, first into bluish violet, darkish-violet flakes being immediately precipitated. On the addition of strong sodium-carbonate solution or soda-lye to the solution of the dyestuff in water this solution assumes a more violet-blue hue. From the solution of the dyestuff in cold water the free sulfo-acid of the color separates in dark-violet flakes when mineral acids—as, for example, dilute hydrochloric or sulfuric acid—are added to the above solution in water. The dyestuff produces on unmordanted cotton dark-blue shades fast to the action of alkali and acid. When fixed on the fiber, the dyestuff can be further diazotized and combined with the so-called "developers"—as, for example, beta-naphthol, metatoluylenediamin—darker and faster shades being thus obtained.

Analogous dyestuffs are obtained if in the above example the benzidin employed is replaced by the homologous paradiamins, such as tolidin or dianisidin. The colors thus produced dye unmordanted cotton in shades somewhat more greenish dark blue.

The process for the production of such dyes may be carried out in a very different manner. It is, however, to be noted that the aforesaid amidonaphtholdisulfo-acid ($NH_2$:$SO_3H$:$SO_3H$:$OH = 2:3:6:8$) when combined in the first place with the tetrazotized diamin must be coupled in an alkaline solution and that the above amidonaphtholmonosulfo-acid ($NH_2$:$SO_3H$:$OH = 1:4:8$) must be coupled in an acid solution when it is combined in the first place with tetrazotized paradiamin, while either of the said amidonaphtholsulfo-acids when used in the second place must be combined in alkaline solution with the intermediate products previously formed.

The present coloring-matter differs from that described in our previous patent, No. 533,508, as appears from the following table:

| Coloring-Matter from the Amidonaphtholdisulfo-Acid 1:3:6:8. | Dyestuff from the Amidonaphtholdisulfo-Acid 2:3:6:8. |
| --- | --- |
| Solution of dyestuff in ammonia, seen on the saucer, greenish blue. | Solution of dyestuff in ammonia, seen on the saucer, bluish-violet. |
| Solution in soda-lye, (thirty-five per cent.,) blue. | Solution in soda-lye, (thirty-five per cent.,) violet. |
| Addition of soda-lye to the watery solution, blue. | Addition of soda-lye to the watery solution, violet. |
| Addition of acetic acid (concentrated) to the hot watery solution of the dyestuff, blue solution. | Addition of acetic acid (concentrated) to the hot watery solution of the dyestuff, violet solution. |

Having now described our invention and in what manner the same is to be performed, what we claim as new, and desire to secure by Letters Patent, is—

1. The process for the production of dark-blue substantive dyestuffs consisting in combining one molecular proportion of a tetrazotized diamin with one molecular proportion of amidonaphtholdisulfo-acid ($NH_2$:$SO_3H$:$SO_3H$:$OH = 2:3:6:8$) and one molecular proportion of amidonaphtholmonosulfo-acid ($NH_2$:$SO_3H$:$OH = 1:4:8$) or alkaline salts thereof in the manner hereinbefore described.

2. As a new article of manufacture the dyes which may result from combining one molecular proportion of a tetrazotized diamin with one molecular proportion of amidonaphtholdisulfo-acid ($NH_2$:$SO_3H$:$SO_3H$:$OH = 2:3:6:8$) and one molecular proportion of amidonaphtholmonosulfo-acid ($NH_2$:$SO_3H$:$OH = 1:4:8$), or alkaline salts thereof having in case benzidin be used the formula:

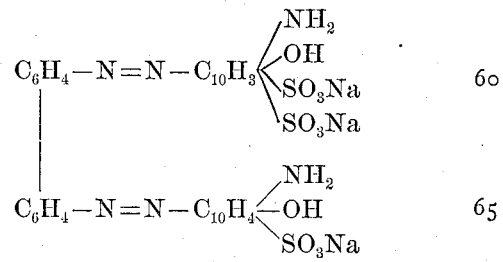

forming a dark powder easily soluble in water with a bluish-black color, almost insoluble in alcohol, soluble in ammonia liquid with a violet-blue color, being slightly soluble in strong soda-lye with a violet color, soluble in concentrated sulfuric acid (66° Baumé) with a greenish-blue color, which turns on the addition of ice-water to this sulfuric-acid solution first into bluish-violet and then darkish-violet flakes are precipitated on addition of acetic acid (concentrated) to the hot watery solution of the dyestuff a violet solution results, producing on unmordanted cotton darkish-blue shades fast to the action of alkali and acid, being diazotizable, when fixed on the fiber, and subsequently giving when combined with so-called "developers" especially with beta-naphthol and metatoluylenediamin darker and faster shades.

In testimony whereof we have signed our names in the presence of two subscribing witnesses.

MORITZ ULRICH.
JOHANN BAMMANN.

Witnesses:
F. H. STRAUSS,
A. STRAUSS.